(12) United States Patent
Tanaka et al.

(10) Patent No.: US 10,264,810 B2
(45) Date of Patent: Apr. 23, 2019

(54) METHOD FOR PROCESSING MARINE NATURAL PRODUCT EXTRACT, MARINE NATURAL PRODUCT EXTRACT AND FOOD OR DRINK PRODUCT

(75) Inventors: Minoru Tanaka, Saitama (JP); Haruka Unno, Saitama (JP); Hiroaki Kanayama, Osaka (JP)

(73) Assignees: RIKEN VITAMIN CO., LTD., Tokyo (JP); SUNACTIS CO., LTD., Osaka (JP)

( * ) Notice: Subject to any disclaimer, the term of this patent is extended or adjusted under 35 U.S.C. 154(b) by 765 days.

(21) Appl. No.: 13/979,245

(22) PCT Filed: Dec. 6, 2011

(86) PCT No.: PCT/JP2011/078163
§ 371 (c)(1),
(2), (4) Date: Aug. 15, 2013

(87) PCT Pub. No.: WO2012/105123
PCT Pub. Date: Aug. 9, 2012

(65) Prior Publication Data
US 2013/0323373 A1    Dec. 5, 2013

(30) Foreign Application Priority Data
Feb. 2, 2011    (JP) .................. 2011-020670

(51) Int. Cl.
*A23L 27/10*    (2016.01)
*B01D 61/44*    (2006.01)
(Continued)

(52) U.S. Cl.
CPC ............... *A23L 27/10* (2016.08); *A23L 5/273* (2016.08); *A23L 17/20* (2016.08); *A23L 17/70* (2016.08); *B01D 61/44* (2013.01)

(58) Field of Classification Search
CPC ........ A23L 1/221; A23L 1/0156; A23L 1/327; A23L 1/3255; A23L 5/273; A23L 17/20; A23L 17/10; A23L 17/70; B01D 61/44
See application file for complete search history.

(56) References Cited

U.S. PATENT DOCUMENTS

| 2,128,551 A * | 8/1938 | Le Gloahec ........ C08B 37/0084 |
|---|---|---|
|  |  | 210/251 |
| 3,433,726 A | 3/1969 | Parsi et al. |

(Continued)

FOREIGN PATENT DOCUMENTS

| JP | 2002-187707 | 7/2002 |
|---|---|---|
| JP | 2005-305265 | 11/2005 |

(Continued)

OTHER PUBLICATIONS

International Search Report dated Jan. 17, 2012 in International (PCT) Application No. PCT/JP2011/078163.

(Continued)

*Primary Examiner* — Steven N Leff
(74) *Attorney, Agent, or Firm* — Wenderoth, Lind & Ponack, L.L.P.

(57) ABSTRACT

An object of the present invention is to remove or reduce iodine contained in a marine natural product extract, while maintaining the original flavor, taste, appearance, etc. of the marine natural product extract before processing. A first anion exchange membrane (5) and a second anion exchange membrane (6) are sequentially arranged from the anode (3) side. Between the anion exchange membranes (5, 6), an extract receiving compartment (9) is formed and fed with a marine natural product extract (21). An iodine recovery compartment (8) is formed on the anode side of the first anion exchange membrane (5). A replenisher receiving compartment (10) is formed on the cathode side of the second anion exchange membrane (6) and fed with a replenisher (Continued)

containing chlorine ions (24). During electrodialysis, the iodine ions contained in the marine natural product extract (21) pass through the first anion exchange membrane (5) and migrate into the iodine recovery compartment (8), while the chlorine ions contained in the replenisher (24) pass through the second anion exchange membrane (6) and replenish the extract receiving compartment (9).

1 Claim, 1 Drawing Sheet

(51) Int. Cl.
*A23L 5/20* (2016.01)
*A23L 17/00* (2016.01)
*A23L 17/20* (2016.01)

(56) References Cited

U.S. PATENT DOCUMENTS 5,049,250 A    9/1991   Chlanda

| | | |
|---|---|---|
| 2004/0029828 A1 | 2/2004 | Nishiyama et al. |
| 2006/0225420 A1* | 10/2006 | Al-Mayahi ............. F03G 7/005 60/645 |
| 2008/0289972 A1 | 11/2008 | Pastacaldi |

FOREIGN PATENT DOCUMENTS

| | | |
|---|---|---|
| JP | 2008-272602 | 11/2008 |
| JP | 4188692 | 11/2008 |
| JP | 2009-518267 | 5/2009 |
| WO | 02/22140 | 3/2002 |

OTHER PUBLICATIONS

International Preliminary Report on Patentability dated Aug. 6, 2013 and English translation of Written Opinion of the International Searching Authority dated Jan. 17, 2012 in International Application No. PCT/JP2011/078163.

Extended European Search Report dated Dec. 2, 2016 in corresponding European Application No. 11857670.1.

Shaoyuan Shi et al., "Comparisons of fish meat extract desalination by electrodialysis using different configurations of membrane stack", Journal of Food Engineering, vol. 101, No. 4, (2010), pp. 417-423.

* cited by examiner

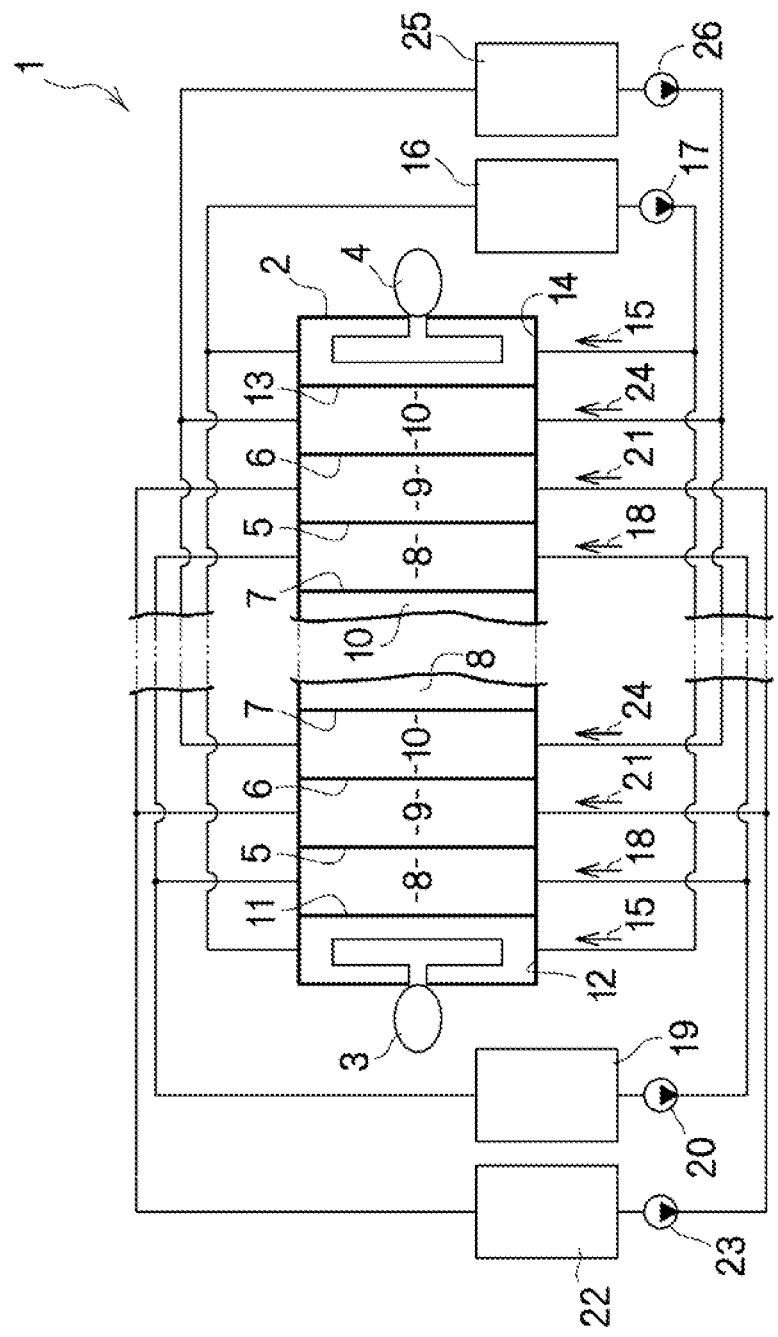

METHOD FOR PROCESSING MARINE NATURAL PRODUCT EXTRACT, MARINE NATURAL PRODUCT EXTRACT AND FOOD OR DRINK PRODUCT

CROSS-REFERENCE TO RELATED APPLICATIONS

This application is a National Phase Application of PCT International Application No. PCT/JP2011/078163, International Filing Date, Dec. 6, 2011, claiming priority to Japan Patent Application No. 2011-020670, filed Feb. 2, 2011, each of which is hereby incorporated by reference in its entirety.

TECHNICAL FIELD

The present invention relates to a method for processing a marine natural product extract by electrodialysis. In particular, the present invention relates to a method for processing a marine natural product extract, the method being capable of removing or reducing iodine contained in the marine natural product extract, while maintaining the original flavor, taste, appearance, etc. of the marine natural product extract before processing; a marine natural product extract obtained by the method; and a food or drink product.

BACKGROUND ART

Marine natural products such as marine algae, fish and shellfish that live in the sea generally take up iodine either directly from the sea water or indirectly through ingestion and accumulate it in their bodies. Among these marine natural products, marine algae are known to contain a lot of iodine. For example, kombu (edible kelp) belonging to brown algae is known to contain a high concentration of iodine, as much as about 500 to 60000 times higher than the iodine content of the sea water. Due to this fact, marine natural product extracts obtained by extraction using, as a raw material, marine natural products such as kombu contain a high concentration of iodine.

Marine natural products as described above and marine natural product extracts obtained using these marine natural products as a raw material have been very commonly eaten in Japan. For example, kombu and a kombu extract obtained using kombu as a raw material are often used to make soup stock and also used in a wide variety of condiments and processed foods.

Iodine is an essential element for the human body. However, in cases where an excessive amount of iodine is ingested, there is a potential risk of development of symptoms such as hypothyroidism and goiter. Accordingly, the Ministry of Health, Labour and Welfare of Japan has established the estimated requirement and the tolerable upper intake level in "Dietary Reference Intakes for Japanese". Hence, in recent years, demands have been raised for a method for reducing iodine contained in marine natural product extracts and marine natural product extracts having a reduced iodine content.

Conventional processing methods for separating iodine ions from an aqueous solution etc. include a processing method for separating iodine ions from an aqueous solution by double substitution electrodialysis, the method being characterized in that chlorine ions are employed as an counter anion for iodine ions and that a monovalent anion permselective membrane is used as an anion exchange membrane (for example, see Patent Literature 1). Another example of such conventional methods is a method for removing iodine from a salt water containing Na, Cl, and I, the method being characterized in that iodine in the salt water is removed by means of an ion exchange resin while the oxidation reduction potential of the salt water is maintained at 100 mV (SHE) or less (for example, see Patent Literature 2). Another proposed method is a processing method for extracting fucoidan from a marine alga in the presence of a reducing substance (for example, see Patent Literature 3).

However, in the above double substitution electrodialysis, components (salt etc.) other than iodine contained in a marine natural product extract are also removed simultaneously. As a result, the obtained marine natural product extract shows imbalance in the component composition as compared with the original marine natural product extract before processing. In the above method with the use of an ion exchange resin, distinctive flavor components contained in a marine natural product extract are also adsorbed to the resin, which results in significant deterioration of the flavor. In the processing method for extracting from a marine alga an extract having a reduced iodine content in the presence of a reducing substance, the addition of the reducing substance greatly changes the flavor of a marine natural product extract.

Therefore, a need has arisen for a processing method of a marine natural product extract, the method being capable of producing a marine natural product extract with excellent flavor by removing iodine without losing taste components and umami components, such as salts and balanced amino acids, contained in the marine natural product extract.

CITATION LIST

Patent Literature

Patent Literature 1: JP 2008-272602 A
Patent Literature 2: JP 2005-305265 A
Patent Literature 3: WO 2002/022140

SUMMARY OF INVENTION

Technical Problem

A technical object of the present invention is to solve the above problems and to provide a method for processing a marine natural product extract, the method being capable of removing or reducing iodine contained in the marine natural product extract, while maintaining the original flavor, taste, appearance, etc. of the marine natural product extract before processing; a marine natural product extract obtained by the method; and a food or drink product.

Solution to Problem

The inventors have conducted extensive research to solve the above problems and, as a result, found that the problems can be solved with the use of an electrodialyzer. The inventors have conducted further research based on the finding and completed the present invention.

That is, the present invention include
(1) a method for processing a marine natural product extract, the method comprising
disposing an anion exchange membrane between an anode and a cathode,
feeding a marine natural, product extract on the cathode side of the anion exchange membrane, and removing at least part of iodine ions from the marine natural product extract by allowing them to pass through the anion exchange membrane by electrodialysis,
the method being characterized in that the electrodialysis is performed using
a first anion exchange membrane and a second anion exchange membrane that are sequentially arranged from the anode side,
an extract receiving compartment that is formed between the anion exchange membranes and fed with the marine natural product extract,
an iodine recovery compartment that is formed on the anode side of the first anion exchange membrane, and
a replenisher receiving compartment that is formed on the cathode side of the second anion exchange membrane and fed with a replenisher containing chlorine ions,
and that the electrodialysis allows the iodine ions contained in the marine natural product extract to pass through the first anion exchange membrane and migrate into the iodine recovery compartment, while allowing the chlorine ions contained in the replenisher to pass through the second anion exchange membrane and replenish the extract receiving compartment;
(2) the method for processing a marine natural product extract according to the above (1), wherein
a plurality of pairs of the first anion exchange membrane and the second anion exchange membrane is disposed between the anode and the cathode in such a manner that an intermediate cation exchange membrane is disposed between each pair,
the iodine recovery compartment is fed with water or an aqueous electrolytic solution,
a first cation exchange membrane is disposed between the anode and the first anion exchange membrane that is most adjacent to the anode, and an anode compartment is formed on the anode side of the first cation exchange membrane, and a second cation exchange membrane is disposed between the cathode and the second anion exchange membrane that is most adjacent to the cathode, and a cathode compartment is formed on the cathode side of the second cation exchange membrane;
(3) a marine natural product extract obtainable by the processing method according to the above (1) or (2);
(4) the marine natural product extract according to the above (3), wherein the salt content is 5 to 50% by mass per 100% by mass of the solid content of the marine natural product extract, and the ratio of the salt content/the iodine content in the solid content of the marine natural product extract is 200 or more; and
(5) a food or drink product comprising the marine natural product extract according to the above (3) or (4).

Advantageous Effects of Invention

A method for processing a marine natural product extract of the present invention exhibits the following effects.

(1) Anions, such as iodine ions, contained in a marine natural product extract in an extract receiving compartment pass through a first anion exchange membrane and migrate into an iodine recovery compartment. On the other hand, cations, such as sodium ions, contained in the marine natural product extract are prevented from migration by a second anion exchange membrane and remain in the marine natural product extract. As a result, the iodine contained in the marine natural product extract is removed or reduced, while efflux of cations is prevented and thereby the original flavor, taste, appearance, etc. of the marine natural product extract before processing are excellently maintained.

(2) The marine natural product extract in the extract receiving compartment is replenished with chlorine ions etc. from a replenisher in a replenisher receiving compartment. As a result, increase in the pH of the marine natural product extract is suppressed and the original flavor, taste, appearance, etc. of the marine natural product extract before processing are further excellently maintained.

BRIEF DESCRIPTION OF DRAWINGS

FIG. 1 is a schematic view showing the structure of an electrodialyzer that is used in an embodiment of the present invention.

DESCRIPTION OF EMBODIMENTS

An embodiment of the present invention will be described below with reference to FIG. 1.

The marine natural product extract used in the processing method of the present invention is understood to mean a marine natural product extract obtained using, as a raw material, marine natural products such as fish, shellfish, and marine algae that live in the sea or brackish water.

The fish and shellfish are not particularly limited and examples thereof include shellfishes such as scallop, basket clam, and oyster; cephalopoda such as squid and octopus; fishes such as sea bream, bonito, tuna, salmon, and globefish; crustaceans such as shrimp, crab, krill, and squilla; echinoderms such as sea urchin and sea cucumber; marine mammals such as whale; etc. Preferred are shellfish, cephalopoda, fish, etc.

The marine algae are also not particularly limited and examples thereof include brown algae such as kombu, wakame, hijiki, fucus, sea trumpet, laver, and hornwort; green algae such as *Monostroma nitidum* and sea lettuce; red algae such as *Porphyra yezoensis* and *Chondrus*; microalgae such as *Spirulina* and *Haematococcus*; etc. Preferred are brown algae such as kombu, wakame, laver, etc.

The method for extracting an extract from the above marine natural products as a raw material is not particularly limited and examples thereof include an extraction method with water, an extraction method with hot water, an extraction method with hydrous alcohol, an extraction method with a supercritical fluid, etc.

For example, a production method of a common kombu extract will be described below.

To makombu (*Laminaria japonica*) (plain dried), water is added and the kombu is left to stand at room temperature for about 30 minutes to 1 hour to allow it to absorb water. The kombu in water is heated up to about 40 to 10° C., preferably about 50 to 70° C., for about 30 to 50 minutes to extract a kombu extract. After the extraction residue is removed, the contaminants are filtered off from the extract and, if desired, concentration to an appropriate level is performed with a vacuum concentrator etc. Thus a kombu extract is obtained.

The form of the marine natural product extract used for the processing method of the present invention is preferably a liquid with fluidity. In cases where the marine natural product extract is in the form of a solid, a viscous paste, etc., the extract can be used after dissolved in or diluted with water.

The iodine content of such a marine natural product extract varies with the type of the marine natural product, the extraction conditions, the concentration conditions, etc. but is usually about 1 to 1000 mg/100 g of the extract.

The solid content of the marine natural product extract used for the processing method of the present invention is not particularly limited. However, if the solid content, i.e., the amount of extractive components, is too low, the whole liquid volume to be fed into an electrodialyzer increases and the electrodialyzer is operated at a low current density, which results in reduction in the production efficiency. On the other hand, if the solid content is too high, the viscosity becomes too high and crystalline or insoluble precipitates are formed, which results in clogging in the electrodialyzer and fouling on the surface of an ion exchange membrane. Accordingly, although the form and solid content of the marine natural product extract depend on the raw material used for the extraction, usually the marine natural product extract is preferably in a liquid form having a solid content of 1 to 50% by mass.

The viscosity of the marine natural product extract in a liquid form is preferably 0.01 Pa·s or less. When the extract contains a large amount of contaminants, there is a high risk of clogging in the electrodialyzer. Thus, preferably such contaminants are removed by filtration etc. beforehand.

An ionized form of iodine is suitable as the iodine contained in the marine natural product extract to achieve enhanced effects of the present invention and, if desired, the pH of the extract can be adjusted with acid or alkali. The pH of the marine natural product extract is usually about 1 to 13, preferably about 2 to 8.

The iodine ions contained in the marine natural product extract are removed by electrodialysis in the present invention. In the electrodialysis used for the present invention, for example, between an anode and a cathode (3, 4), a first anion exchange membrane (5) and a second anion exchange membrane (6) are sequentially arranged from the anode (3) side, as shown in FIG. 1. Between the anion exchange membranes (5, 6), an extract receiving compartment (9) is formed. On the anode side of the is first anion exchange membrane (5), an iodine recovery compartment (8) is formed. On the cathode side of the second anion exchange membrane (6), a replenisher receiving compartment (10) is formed. Preferably, a first cation exchange membrane (11) is disposed between the anode (3) and the first anion exchange membrane (5) that is most adjacent to the anode (3), and a second cation exchange membrane (13) is disposed between the cathode (4) and the second anion exchange membrane (6) that is most adjacent to the cathode (4). In this way, an anode compartment (12) provided with the anode (3) is separated from the iodine recovery compartment (8) by the first cation exchange membrane (11), and a cathode compartment (14) provided with the cathode (4) is separated from the replenisher receiving compartment (10) by the second cation exchange membrane (13). A marine natural product extract (21) is fed into the extract receiving compartment (9) and a replenisher containing chlorine ions (24) is fed into the replenisher receiving compartment (10). Then, electrodialysis is performed. It is possible to provide only a single pair of the anion exchange membranes (5, 6), but preferably a plurality of pairs of the anion exchange membranes (5, 6) is disposed between the anode and the cathode (3, 4) in such a manner that an intermediate cation exchange membrane (7) is disposed between each pair. In the latter case, each extract receiving compartment (9) formed between the anion exchange membranes (5, 6) of each pair is fed with the marine natural product extract (21) and thus a large quantity of the marine natural product extract (21) can be processed simultaneously. The number of repeats of the pair is determined depending on the purpose but is preferably about 10 to 150.

FIG. 1 is a schematic view showing the structure of an exemplary electrodialyzer that is used in the processing method of the present invention. In this electrodialyzer (1), an anode (3) and a cathode (4) are disposed in a dialysis tank (2). Between the anode and the cathode (3, 4), a plurality of pairs of a first anion exchange membrane (5) on the anode (3) side and a second anion exchange membrane (6) on the cathode (4) side is disposed in such a manner that an intermediate cation exchange membrane (7) is provided between each pair of the anion exchange membranes.

On the anode side of the first anion exchange membrane (5), an iodine recovery compartment (8) is formed. Between the anion exchange membranes (5, 6), an extract receiving compartment (9) is formed. On the cathode side of the second anion exchange membrane (6), a replenisher receiving compartment (10) is formed. The iodine recovery compartment (8) and the replenisher receiving compartment (10) that are adjacent with each other are separated by the intermediate cation exchange membrane (7).

The separation of the anode (3) from the iodine recovery compartment (8) by an ion exchange membrane is not essential. However, if chlorine ions migrate along with iodine ions from the extract receiving compartment (9) to the iodine recovery compartment (8) during electrodialysis, the chlorine ions come in contact with the anode and then electrically oxidized into chlorine gas, which may corrode the anode and degrade the ion exchange membrane. In order to prevent these risks, a first cation exchange membrane (11) is disposed between the anode (3) and the first anion exchange membrane (5) that is most adjacent to the anode (3), and an anode compartment (12) is formed on the anode (3) side of the first cation exchange membrane (11).

The separation of the cathode (4) from the replenisher receiving compartment (10) by an ion exchange membrane is also not essential. However, if an electrode solution in the surroundings of the cathode (4) is reused in the anode compartment (12) through circulation etc., chlorine ions contained in the solution in the replenisher receiving compartment (10) flow into the anode compartment (1.2) via the surroundings of the cathode (4) and may cause adverse effects on the anode (3). Further, in cases where sodium sulfate is used as the electrode solution (15) without the second cation exchange membrane (13), sulfate ions may pass through the second anion exchange membrane (6) and migrate into the extract receiving compartment (9). In order to prevent these risks, a second cation exchange membrane (13) is disposed between the cathode (4) and the second anion exchange membrane (6) that is most adjacent to the cathode (4), and an cathode compartment (14) is formed on the cathode (4) side of the second cation exchange membrane (13).

As the anode (3), graphite, platinum, platinized titanium, etc. are used, and as the cathode (4), iron, nickel, stainless steel, etc. are used. In the anode compartment (12) and cathode compartment (14) where the electrodes (3, 4) are disposed, an about 0.1 to 10% (w/v) aqueous electrolyte solution is fed as the electrode solution (15). The components of the aqueous electrolyte are not particularly limited and, for example, a sodium sulfate solution etc. are used. This electrode solution (15) is circulated between the dialysis tank (2) and an electrode solution reservoir (16) outside the dialysis tank (2) by means of a circulating pump (17) etc.

As each of the cation exchange membranes (7, 11, 13), known cation exchange membranes can be used and examples thereof include cation exchange membranes having an ion exchange group such as a sulfonic acid group, a carboxylic acid group, a phosphonic acid group, a sulfuric acid ester group, and a phosphoric acid ester group, or having more than one of these ion exchange groups. The known cation exchange membranes may be of any type, model etc., regardless of the material and production method. Examples thereof include a membrane of a polymeric type, a conjugated type, a homogeneous type, or a heterohomogeneous type; a membrane with or without a reinforcing core; a hydrocarbon based membrane and a fluorine based membrane; etc. In addition, even a membrane generally called an amphoteric ion exchange membrane can be used as the cation exchange membrane as long as the membrane substantially serves as a cation exchange membrane, i.e., as long as the membrane is capable of electrodialyzing a 2 N salt solution at a current density of 5 A/dm$^2$ with a current efficiency of 70% or more. Examples of commercially available cation exchange membranes include Neosepta CMX (product name; ASTOM Corporation), Neosepta CIMS (product name; ASTOM Corporation), etc.

As each of the anion exchange membranes (5, 6), known anion exchange membranes can be used and examples thereof include anion exchange membranes having a quaternary ammonium group, a primary amino group, a secondary amino group, a tertiary amino group, or more than one of these ion exchange groups. The known anion exchange membranes may be of any type, model, etc., regardless of the material and production method. Examples thereof include a membrane of a polymeric type, a conjugated type, a homogeneous type, or a heterohomogeneous type; a membrane with or without a reinforcing core; a hydrocarbon based membrane and a fluorine based membrane; etc. In addition, even a membrane generally called an amphoteric ion exchange membrane can be used as the anion exchange membrane as long as the membrane substantially serves as an anion exchange membrane, i.e., as long as the membrane is capable of electrodialyzing a 2 N salt solution at a current density of 5 A/dm$^2$ with a current efficiency of 70% or more. Examples of commercially available anion exchange membranes include Neosepta AMX (product name; ASTOM Corporation), Neosepta ACS (product name; ASTOM Corporation), etc.

Into the iodine recovery compartment (8), water or a dilute aqueous electrolytic solution (18) is fed. This dilute aqueous electrolytic solution is used to increase the electric conduction efficiency between the electrodes in the start-up phase of the operation, but in the present invention water can be used instead of the solution. Examples of the aqueous electrolytic solution include a sodium chloride aqueous solution, a potassium chloride aqueous solution, a hydrochloric acid solution, etc. The water or dilute aqueous electrolytic solution (18) is circulated between the dialysis tank (2) and an electrolytic solution reservoir (19) outside the dialysis tank (2) by means of a circulating pump (20) etc.

Into the extract receiving compartment (9), the marine natural product extract (21) is fed. The marine natural product extract (21) is circulated between the dialysis tank (2) and an extract reservoir (22) outside the dialysis tank (2) by means of a circulating pump (23) etc.

Into the replenisher receiving compartment (10), a replenisher containing chlorine ions (24) is fed. The replenisher (24) is not limited to ones containing specific components. Preferred examples of the replenisher include hydrochloric acid, a sodium chloride aqueous solution, a potassium chloride aqueous solution, etc., which are available at a low cost and less likely to deposit as a scale in the electrodialyzer. More preferred is a sodium chloride aqueous solution. The molar concentration of chlorine ions contained in the replenisher (24) is not limited to a specific concentration but is preferably about 0.1 to 6 mol/L, more preferably about 1 to 4.5 mol/L. The replenisher (24) is circulated between the dialysis tank (2) and a replenisher reservoir (25) outside the dialysis tank (2) by means of a circulating pump (26) etc.

The above embodiment is preferable in that continuous processing can be achieved due to circulation feed of each solution and of the marine natural product extract into the extract receiving compartment (9), the replenisher receiving compartment (10), the iodine recovery compartment (8), the anode compartment (12), and the cathode compartment (14) by means of the pumps etc. However, the feed of the solutions and the marine natural product extracts may be continuous or intermittent in the present invention. The temperatures of each solution and the marine natural product extract during the electrodialysis are usually set at the range of 5 to 70° C., preferably 20 to 50° C.

In the processing method of the marine natural product extract of the present invention, ion substitution by ion exchange membrane electrodialysis is performed through application of a direct current voltage between the anode (3) and the cathode (4). In this processing, the voltage between the anode (3) and the cathode (4) is adjusted to 0.2 to 2.0 V per combination of the pair of the anion exchange membranes (5, 6) and the intermediate cation exchange membrane (7), and the electric current is adjusted to 0.1 to 10 A per dm$^2$ of the ion exchange membrane.

During the electrodialysis, the anions contained in the marine natural product extract (21) in the extract receiving compartment (9) pass through the first anion exchange membrane (5) and migrate into the iodine recovery compartment (8) on the anode side. The cations contained in the marine natural product extract (21) are prevented from migration by the second anion exchange membrane (6) and remain in the marine natural product extract (21), not migrating toward the replenisher receiving compartment (10) on the cathode side.

The anions contained in the replenisher (24) in the replenisher receiving compartment (10) pass through the second anion exchange membrane (6) and migrate into the extract receiving compartment (9) on the anode side. The cations contained in the replenisher (24) pass through the intermediate cation exchange membrane (7) and migrate into the iodine recovery compartment (8) on the cathode side, or pass through the second cation exchange membrane (13) and migrate into the cathode compartment (14).

The anions contained in the water or dilute aqueous electrolytic solution (18) in the iodine recovery compartment (8) are prevented from migration by the first cation exchange membrane (11) or the intermediate cation exchange membrane (7) and remain in the iodine recovery compartment (8), not migrating toward the anode compartment (12) or the replenisher receiving compartment (10) on the anode side. The cations contained in the water or dilute aqueous electrolytic solution (18) are prevented from migration by the first anion exchange membrane (5) and remain in the iodine recovery compartment (8), not migrating toward the extract receiving compartment (9) on the cathode side.

As mentioned above, the iodine ions (anions) contained in the marine natural product extract (21) in the extract receiving compartment (9) migrate into the iodine recovery compartment (8) on the anode side. In this way, the iodine contained in the marine natural product extract is removed or reduced. At the same time, from the replenisher receiving compartment (10) on the cathode side of the extract receiving compartment (9), anions such as chlorine ions etc. migrate into the extract receiving compartment (9). As a result, the processing method using the electrodialysis can produce a marine natural product extract in which cation levels, extract component levels and amino acid levels, etc. are maintained without much change compared with those before the electrodialysis.

The marine natural product extract obtained by the processing method of the present invention is characterized in that the iodine contained in the marine natural product extract is removed or reduced, while the salt content (salt equivalent) is not much changed. The salt content per 100% by mass of the solid content of the marine natural product extract is preferably about 5 to 50% by mass, more preferably about 15 to 40% by mass. The ratio of the salt content to the iodine content (salt content/iodine content) in the solid content of the marine natural product extract is preferably about 200 or more, more preferably about 500 or more.

Examples of the present invention will be described below. These Examples are merely illustrative and are not intended to limit the present invention.

EXAMPLES (1) Preparation of Kombu Extract (Unprocessed Extract)

To 100 g of makombu (plain dried), 1500 mL of water was added and the kombu was left to stand at room temperature for 30 minutes. The kombu in water was heated up to 50° C. and this condition was maintained for 50 minutes. Next, the kombu residue was removed and the extract was separated with a filter paper. The extract was concentrated to a 40% Brix concentration using a vacuum concentrator (model: rotary evaporator N-1000; Tokyo Rikakikai Co., Ltd.) to give 80 g of a kombu extract (unprocessed extract). The pH of the obtained kombu extract (unprocessed extract) was measured to be 5.37.

Here, the Brix concentration was measured with a portable sugar meter (model: APAL-1; As One Corporation) and the pH was measured with a glass-electrode hydrogen ion concentration meter (model: HM-20P; DKK-TOA CORPORATION).

(2) Processing of Kombu Extract (Unprocessed Extract) by Electrodialysis

Example 1

The above kombu extract (unprocessed extract) was subjected to electrodialysis using an electrodialyzer (model: EX-3B; ASTOM Corporation). The ion exchange membranes used for the electrodialyzer were cation exchange membranes (model: Neosepta CMX-SB; ASTOM Corporation) and anion exchange membranes (model: Neosepta AMX-SB; ASTOM Corporation).

The electrodialyzer was a filter press type assembled by disposing each ion exchange membrane as follows: a first cation exchange membrane (11) was disposed on the anode side; 10 pairs of a first anion exchange membrane (5) and a second anion exchange membrane (6) were disposed in such a manner that an intermediate cation exchange membrane (7) was disposed between each pair; and a second cation exchange membrane (13) was disposed on the cathode side. The area of a current-carrying part of each of the anion exchange membranes (5, 6) in contact with the kombu extract was set to 55 cm². The ion exchange membranes were disposed at equal intervals.

Next, pure water (18) was fed into an iodine recovery compartment (8) separated by the first anion exchange membrane (5) and either the first cation exchange membrane (11) or the intermediate cation exchange membrane (7). The kombu extract (21) was fed into an extract receiving compartment (9) separated by the anion exchange membranes (5, 6). A replenisher (24) containing a 17.45% (w/v) sodium chloride solution (molar concentration of chlorine ions: 2.99 mol/L) was fed into a is replenisher receiving compartment (10) separated by the second anion exchange membrane (6) and either the intermediate cation exchange membrane (7) or the second cation exchange membrane (13). Then, each solution was circulated at a flow rate of 4 mL/second. The total volumes of each solution and of the kombu extract were 500 mL. A 5% (w/v) sodium sulfate aqueous solution was used as an electrode solution (15). While the temperatures of each solution and of the kombu extract were adjusted to the range of 20 to 35° C., a voltage at 10 V (current density at the maximum setting: 5 A/dm²) was applied between the anode and the cathode (3, 4) for 150 minutes to perform electrodialysis and thus a kombu extract of Example 1 was obtained. The pH of the kombu extract obtained in Example 1 was measured to be 5.47.

Example 2

The above kombu extract (unprocessed extract) was subjected to electrodialysis using an electrodialyzer (model: EX-3B; ASTOM Corporation). The ion exchange membranes used for the electrodialyzer were cation exchange membranes (model: Neosepta CIMS; monovalent cation permselective membrane; ASTOM Corporation) and anion exchange membranes (model: Neosepta ACS; monovalent anion permselective membrane; ASTOM Corporation).

The electrodialyzer was a filter press type assembled by disposing each ion exchange membrane as follows: a first cation exchange membrane (11) was disposed on the anode side; 10 pairs of a first anion exchange membrane (5) and a second anion exchange membrane (6) were disposed in such a manner that an intermediate cation exchange membrane (7) was disposed between each pair; and a second cation exchange membrane (13) was disposed on the cathode side. The area of a current-carrying part of each of the anion exchange membranes (5, 6) in contact with the kombu extract was set to 55 cm². The ion exchange membranes were disposed at equal intervals.

Next, pure water (18) was fed into an iodine recovery compartment (8) separated by the first anion exchange membrane (5) and either the first cation exchange membrane (11) or the intermediate cation exchange membrane (7). The kombu extract (21) was fed into an extract receiving compartment (9) separated by the anion exchange membranes (5, 6). A replenisher (24) containing a 17.45% (w/v) sodium chloride solution (molar concentration of chlorine ions: 2.99 mol/L) was fed into a replenisher receiving compartment (10) separated by the second anion exchange membrane (6) and either the intermediate cation exchange membrane (7) or the second cation exchange membrane (13). Then, each solution was circulated at a flow rate of 4 mL/second. The total, volumes of each solution and of the kombu extract were 500 mL. A 5% (w/v) sodium sulfate aqueous solution was used as an electrode solution (15). While the temperatures of each solution and of the kombu extract were adjusted to the range of 20 to 35° C., a voltage at 15 V (current density at the maximum setting: 5 A/dm²) was applied between the anode and the cathode (3, 4) for 210 minutes to perform electrodialysis and thus a kombu extract of Example 2 was obtained. The pH of the kombu extract obtained in Example 2 was measured to be 5.48.

Comparative Example 1

The above unprocessed kombu extract obtained in Preparation of Kombu Extract was subjected to electrodialysis using an electrodialyzer for usual desalination process (model: S-3; ASTOM Corporation). The ion exchange membranes used for the electrodialyzer were the same as those used in Example 1, the cation exchange membranes (model: Neosepta CMX-SB; ASTOM Corporation) and the anion exchange membranes (model: Neosepta AMX-SB; ASTOM Corporation).

The electrodialyzer was a filter press type assembled by disposing each ion exchange membrane as follows: the cation exchange membrane was disposed on the anode side; and 10 pairs of the anion exchange membrane and the cation exchange membrane were disposed. The area of a current-carrying part of each anion exchange resin (one of the pair) in contact with the kombu extract was set to 55 cm$^2$. The ion exchange membranes were disposed at equal intervals, as in Example 1.

Next, pure water was fed into a solution compartment separated by the anion exchange membrane and the cation exchange membrane positioned on the anode side of the anion exchange membrane. The kombu extract was fed into a solution compartment separated by the anion exchange membrane and the cation exchange membrane positioned on the cathode side of the anion exchange membrane. Then, each solution was circulated at a flow rate of 4 mL/second. The total, volumes of the pure water and of the kombu extract were 500 mL. A 5% (w/v) sodium sulfate aqueous solution was used as an electrode solution (15). While the temperatures of the pure water and of the kombu extract were adjusted to the range of 20 to 35° C., a voltage at 10 V (current density at the maximum setting: 5 A/dm$^2$) was applied between the anode and the cathode for 135 minutes to perform electrodialysis and thus a kombu extract of Comparative Example 1 was obtained. The pH of the kombu extract obtained in Comparative Example 1 was measured to be 5.60.

Comparative Example 2

A kombu extract of Comparative Example 2 was obtained in the same manner as in Comparative Example 1 except that the electrodialysis time was changed from 135 minutes to 60 minutes.

The pH of the kombu extract obtained in Comparative Example 2 was measured to be 5.47.

(3) Sensory Evaluation of Kombu Extract Processed by Electrodialysis

One gram of each of the following extracts, the unprocessed extract and the kombu extracts of Examples 1 and 2 and Comparative Examples 1 and 2, was weighed out into a 200 mL beaker and dissolved in boiling water so that the Brix concentration was 1%. On each sample, sensory evaluation was performed for appearance, aroma, and taste.

The evaluation criteria and scores for each sensory evaluation item are as follows.

Appearance (color)
Score 3: clear and a distinctive yellow to pale yellow color of a kombu extract
Score 2: turbid and a distinctive yellow to pale yellow color of a kombu extract
Score 1: turbid and pale brown color instead of a distinctive yellow to pale yellow color of a kombu extract
Aroma
Score 3: a distinctive mellow aroma of a kombu extract and excellent balance of aroma
Score 2: a distinctive aroma of a kombu extract but a relatively poor balance of aroma
Score 1: a subtle, distinctive aroma of a kombu extract and poor balance of aroma
Taste
Score 3: distinctive umami and saltiness of a kombu extract and excellent balance of taste
Score 2: distinctive umami and saltiness of a kombu extract but poor balance of taste
Score 1: subtle, distinctive umami and saltiness of a kombu extract and poor balance of taste The above sensory evaluation was performed by five panelists in accordance with the above evaluation criteria and the mean values of the scores were calculated and shown by the following symbols. The results are shown in Table 1.
G (good): mean value of 2.5 or more
F (fair): mean value of 1.5 or more and less than 2.5
P (poor): mean value of less than 1.5

TABLE 1

|  | Unprocessed | Example 1 | Example 2 | Comparative Example 1 | Comparative Example 2 |
|---|---|---|---|---|---|
| Appearance (color) | G | G | G | P | P |
| Aroma | G | G | G | F | F |
| Taste | G | G | G | P | P |

As apparent from the above results, the kombu extracts of Examples 1 and 2 of the present invention had color and taste comparable with those of the unprocessed kombu extract. On the other hand, the color and taste of the kombu extracts of Comparative Examples 1 and 2 were quite different from those of the unprocessed kombu extract.

(4) Analysis of Components of Kombu Extracts Processed by Electrodialysis

The iodine, salt (salt equivalent), total nitrogen, mannitol, free amino acid and solid contents of the kombu extracts processed by electrodialysis in Examples 1 and 2 and Comparative Examples 1 and 2 were measured and compared with those of the unprocessed kombu extract.

The following component contents were measured by the following methods.

(a) Iodine Content

The iodine content was measured by gas chromatography. Each kombu extract was taken into a beaker and diluted with distilled water to an appropriate concentration. The diluted extract was filtered through a No. 5B filter paper and the volume was adjusted to a given level in a volumetric flask. To this sample, 0.7 mL of 18 N sulfuric acid, 1.0 mL of methyl ethyl ketone, and 1.0 mL of a 200 ppm sodium nitrite solution were added and the mixture was left to stand for 20 minutes. Hexane was added and the mixture was well stirred. The hexane layer was separated and used as a sample. One microliter of this sample was subjected to measurement with a gas chromatograph (model: 6890N; Agilent Technologies).

(b) Salt Content (Salt Equivalent)

The salt content (salt equivalent) was measured by the Volhard's wet quantitative method.

To 0.5 g of each kombu extract taken into a 200 mL conical flask, 20 mL of a 0.1 N silver nitrate aqueous solution and 20 mL of a 13 N concentrated nitric acid were added and the mixture was heated in a boiling water bath for 30 minutes. After the mixture was allowed to cool, 5 mL of an iron alum indicator was added and titrated with 0.1 N potassium thiocyanate to measure the salt content as NaCl equivalent.

(c) Total Nitrogen Content

The total nitrogen content was measured with the Kjeldahl method.

To 1.5 g of each kombu extract taken into a Kjeldahl flask, a decomposition accelerator (trade name: KJELTABS C; Thompson & Copper) and 36 N concentrated nitric acid were added and the mixture was ignited at 450° C. for 100 minutes to decompose the extract. After the mixture was allowed to cool, 10 mL of deionized water was added and the total nitrogen content was measured with an automatic Kjeldahl distillation unit (model: K378; BUCHI).

(d) Mannitol Content

The mannitol content was measured by gas chromatography.

To 2 g of each kombu extract, 50 mL ethanol was added and the volume was adjusted to 100 mL with deionized water. One milliliter of this solution was taken and the solvent was evaporated. The residue was trimethylsilylated by addition of a trimethylsilylation agent and 10 mL of anhydrous pyridine was added to give a sample. Five microliter of this sample was subjected to measurement with a gas chromatograph (model: GC-14A; Shimadzu).

(e) Free Amino Acid Content

The free amino acid content was measured with an automatic amino acid analyzer.

One gram of each of the obtained kombu extracts was taken out and the volume was adjusted to 50 mL with a lithium citrate buffer (pH 2.4). The mixture was filtered through a No. 131 filter paper to give a sample. This sample was subjected to measurement with an amino acid analyzer (model: JLC-500/V; JEOL).

(f) Solid Content

The solid content was measured with a normal-pressure dry heating method.

After drying 0.5 g of each of the obtained kombu extracts at 105° C. for 3 hours, the solid content was measured.

The above measurement results are shown in Table 2. The results are presented by the residual ratio of each component, i.e., the mass ratio of each component contained in the kombu extracts processed by electrodialysis when the mass of each component contained in the unprocessed extract is defined as 100.

TABLE 2

|  | Unprocessed | Example 1 | Example 2 | Comparative Example 1 | Comparative Example 2 |
| --- | --- | --- | --- | --- | --- |
| Iodine | 100.0 | 11.8 | 3.2 | 0.9 | 12.1 |
| Salt (salt equivalent) | 100.0 | 85.6 | 100.0 | 0.3 | 47.1 |
| Total nitrogen | 100.0 | 83.3 | 81.6 | 48.2 | 83.7 |
| Mannitol | 100.0 | 100.0 | 97.7 | 98.0 | 100.0 |
| Free amino acids |  |  |  |  |  |
| Aspartic acid | 100 | 96 | 96 | 51 | 91 |
| Threonine | 100 | 83 | 91 | 34 | 91 |
| Serine | 100 | 88 | 86 | 28 | 88 |
| Glutamic acid | 100 | 96 | 99 | 59 | 91 |
| Proline | 100 | 95 | 84 | 34 | 89 |
| Glycine | 100 | 96 | 82 | 92 | 90 |
| Alanine | 100 | 94 | 87 | 71 | 88 |
| Valine | 100 | 96 | 85 | 54 | 89 |
| Isoleucine | 100 | 98 | 74 | 44 | 87 |
| Leucine | 100 | 96 | 81 | 47 | 87 |
| Tyrosine | 100 | 94 | 83 | 51 | 88 |
| Phenylalanine | 100 | 89 | 81 | 45 | 83 |
| Histidine | 100 | 100 | 61 | 47 | 100 |

TABLE 2-continued

|  | Unprocessed | Example 1 | Example 2 | Comparative Example 1 | Comparative Example 2 |
| --- | --- | --- | --- | --- | --- |
| Lysine | 100 | 100 | 55 | 24 | 94 |
| Ammonia | 100 | 75 | 57 | 35 | 52 |
| Arginine | 100 | 87 | 81 | 1 | 82 |
| Solid content | 100.0 | 86.0 | 96.0 | 32.3 | 66.7 |

As is apparent from the above analysis results, Examples 1 and 2 of the present invention had a greatly reduced iodine content without much change in the salt content (salt equivalent), the total nitrogen content, the free amino acid composition, and the solid content as compared with those of the unprocessed extract. On the other hand, although Comparative Example 1 had a greatly reduced iodine content, drastic changes were observed in the salt content (salt equivalent), the nitrogen content, the free amino acid composition, and the solid content. Comparative Example 2 had a reduced iodine content that was comparable with those of Examples 1 and 2 and the residual ratio of the salt content was higher than that of Comparative Example 1; however, the salt content was still much lower than those of the unprocessed extract and Examples 1 and 2 of the present invention, and the residual ratio of the solid content was also low.

Table 3 shows the salt and iodine contents per 100% by mass of the solid content and the ratio of the salt content/the iodine content in the unprocessed extract and in the extracts of Examples 1 and 2 and Comparative Examples 1 and 2.

TABLE 3

Contents per 100% by mass of solid content of kombu extracts

|  | Unprocessed | Example 1 | Example 2 | Comparative Example 1 | Comparative Example 2 |
| --- | --- | --- | --- | --- | --- |
| Salt content (% by mass) | 38.3 | 39.5 | 40.0 | 0.4 | 28.4 |
| Iodine content (% by mass) | 1.140 | 0.064 | 0.037 | 0.003 | 0.290 |
| Salt content / Iodine content | 34 | 617 | 1081 | 133 | 98 |

The method for processing a marine natural product extract, the marine natural product extract, etc. that have been described in the above embodiments and Examples are only illustrative for the technical idea of the present invention. The type of the marine natural product extract, the electrodialyzer used for the processing, the types of the ion exchange membranes, the number and capacities of the compartments to be disposed, the types of the aqueous electrolytic solution and the replenisher, etc. are not limited to those described in the above embodiments or Examples and can be variously modified within the scope of the claims of the present invention.

For example, in the above Examples, with the use of the kombu extract as the marine natural product extract, the present invention can exhibit extremely excellent effect of removing or reducing iodine contained in the extract while excellently maintaining the original flavor, taste, appearance, etc. of the extract. However, needless to say, other types of marine natural product extracts can be used in the present invention.

INDUSTRIAL APPLICABILITY

A marine natural product extract obtainable by the processing method of the present invention is characterized in that iodine contained in the marine natural product extract is removed or reduced, while the original flavor, taste, appearance, etc. of the marine natural product extract before processing are excellently maintained. Thus, the obtained marine natural product extract is particularly suitable for various kinds of condiments, processed foods, etc.

REFERENCE SIGNS LIST

3. Anode
4. Cathode
5. First anion exchange membrane
6. Second anion exchange membrane
7. Intermediate cation exchange membrane
8. Iodine recovery compartment
9. Extract receiving compartment
10. Replenisher receiving compartment
11. First cation exchange membrane
12. Anode compartment
13. Second cation exchange membrane
14. Cathode compartment
18. Water or dilute aqueous electrolytic solution
21. Marine natural product extract (kombu extract)
24. Replenisher

The invention claimed is:

1. A method for processing a marine natural product extract, comprising:
   disposing an anion exchange membrane between an anode and a cathode,
   feeding a marine natural product extract comprising iodine ions on the cathode side of the anion exchange membrane, and
   removing at least a part of the iodine ions from the marine natural product extract by allowing the iodine ions to pass through the anion exchange membrane by electrodialysis,
   wherein the electrodialysis is performed using an electrodialyzer comprising:
   a plurality of pairs of a first anion exchange membrane of monovalent anion permselective membrane and a second anion exchange membrane of monovalent anion permselective membrane disposed between the anode and the cathode in such a manner that an intermediate cation exchange membrane is disposed between each pair of the first and second anion exchange membranes, juxtaposing to each other and sequentially arranged from the anode side,
   an extract receiving compartment that is formed between each pair of the first and second anion exchange membranes and fed with the marine natural product extract,
   an iodine recovery compartment that is formed on the anode side of each pair of the first and second anion exchange membranes and fed with water or an aqueous electrolytic solution,
   a replenisher receiving compartment that is formed on the cathode side of each pair of the first and second anion exchange membranes and fed with a replenisher comprising chlorine ions at a concentration of 1 to 6 mol/L,
   a first cation exchange membrane that is disposed between the anode and the first anion exchange membrane which is closest to the anode, together with an anode compartment that is formed on the anode side of the first cation exchange membrane, and
   a second cation exchange membrane that is disposed between the cathode and the second anion exchange membrane which is closest to the cathode, together with a cathode compartment that is formed on the cathode side of the second cation exchange membrane,
   and wherein the electrodialysis allows the iodine ions contained in the marine natural product extract to pass through the first anion exchange membrane and migrate into the iodine recovery compartment, while allowing the chlorine ions contained in the replenisher to pass through the second anion exchange membrane and replenish the extract receiving compartment.

* * * * *